(12) United States Patent
Schrader et al.

(10) Patent No.: US 9,419,683 B2
(45) Date of Patent: Aug. 16, 2016

(54) CONNECTOR BETWEEN TWO APPARATUSES FOR FOOD PRODUCTION

(71) Applicant: ALBERT HANDTMANN MASCHINENFABRIK GMBH & CO. KG, Biberach (DE)

(72) Inventors: Wolfgang Schrader, Biberach (DE); Lothar Miller, Burgrieden-Rot (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 122 days.

(21) Appl. No.: 14/228,516

(22) Filed: Mar. 28, 2014

(65) Prior Publication Data

US 2014/0333402 A1 Nov. 13, 2014

(30) Foreign Application Priority Data

May 10, 2013 (EP) .................................... 13167222

(51) Int. Cl.
*H04B 5/00* (2006.01)
*H01F 38/14* (2006.01)
*A22C 11/00* (2006.01)
*A22C 7/00* (2006.01)

(52) U.S. Cl.
CPC .............. *H04B 5/0012* (2013.01); *H01F 38/14* (2013.01); *H04B 5/005* (2013.01); *H04B 5/0031* (2013.01); *H04B 5/0075* (2013.01); *A22C 7/00* (2013.01); *A22C 11/00* (2013.01)

(58) Field of Classification Search
CPC ...... H04B 5/00; H04B 5/0025; H04B 5/0031; H04B 5/005; H04B 5/0075; H04B 5/0093; H04B 5/0012; H01F 38/14

USPC ........................ 333/24 R, 260, 177; 455/41.1
See application file for complete search history.

(56) References Cited

U.S. PATENT DOCUMENTS

| 5,572,441 | A  | 11/1996 | Boie |
| 6,932,688 | B2 | 8/2005  | Stanley et al. |

(Continued)

FOREIGN PATENT DOCUMENTS

| EP | 1623628 A2 | 2/2006 |
| EP | 1885085 A1 | 2/2008 |

(Continued)

OTHER PUBLICATIONS

European Official Communication, corresponding European Application No. 13 167 222.2, mailing date Oct. 1, 2015.

(Continued)

*Primary Examiner* — Benny Lee
*Assistant Examiner* — Albens Dieujuste
(74) *Attorney, Agent, or Firm* — Marshall, Gerstein & Borun LLP

(57) ABSTRACT

A connector for data transmission at an interface between two apparatuses for food production, such as meat and sausage production, having a first connecting element connected to the first apparatus and being at least one first data transmission part, a second connecting element connected to the second apparatus and being at least one second data transmission part, the first data transmission part being galvanically isolated from the second data transmission part such that data transmission from the first connecting element to the second connecting element is effected in a galvanically isolated manner.

21 Claims, 6 Drawing Sheets

(56) References Cited

U.S. PATENT DOCUMENTS

| | | | |
|---|---|---|---|
| 7,345,639 B2 | 3/2008 | Prill et al. | |
| 8,104,165 B1 * | 1/2012 | Steigerwald | H01Q 1/521 29/600 |
| 2010/0007214 A1 | 1/2010 | Howard et al. | |
| 2011/0260786 A1 * | 10/2011 | Kuroda | G06K 7/10178 327/594 |
| 2013/0266026 A1 * | 10/2013 | McCormack | G06F 13/00 370/474 |
| 2014/0091758 A1 * | 4/2014 | Hidaka | H01F 38/14 320/108 |

FOREIGN PATENT DOCUMENTS

| | | | |
|---|---|---|---|
| EP | 2073315 | A2 | 6/2009 |
| JP | 61-174607 | | 8/1986 |
| JP | 09-083414 | | 3/1997 |
| JP | 09-213550 | | 8/1997 |
| JP | 11-122146 | | 4/1999 |
| JP | 2008-103902 | | 5/2008 |

OTHER PUBLICATIONS

Search report for EP 13 16 7222, dated Oct. 15, 2013.
Office Action, Japanese patent application No. P2014-054893, dated Mar. 24, 2015.
English Translation of Chinese Office Action for Patent Application No. 201410192626.7, issued Dec. 23, 2015.

* cited by examiner

CONNECTOR BETWEEN TWO APPARATUSES FOR FOOD PRODUCTION

CROSS-REFERENCE TO RELATED APPLICATION

The application claims priority of European Application No. 13 167 222.2, filed May 10, 2013. The priority application, EP 13 167 222.2, is hereby incorporated by reference.

FIELD OF THE DISCLOSURE

The present disclosure relates to a connector and to a method for data transmission, e.g. for Ethernet-based field bus systems, at an interface between two apparatuses, in particular for process data transmission between two apparatuses for food production, mainly for meat and sausage production.

BACKGROUND

In food production, in particular in meat and sausage production, several individual apparatuses whose functions must be matched are provided in a production line. In process data transmission for Ethernet-based field bus systems, up to now conventional cables and plugs have been used, as is represented, for example, in FIG. 17. Cables and plugs often involve malfunctions, standstills and failures in machines in rough surroundings.

In case of electric pin-and-socket connectors, in particular the connector pin and the associated socket contact are, in an unplugged condition, susceptible to mechanical damage, soiling and corrosion. In most commercially available pin-and-socket connectors, even water or cleansing chemicals may penetrate through the pin-and-socket connector into the cable when the connector is not plugged in, causing severe damage to the cable by corrosion. The transition from the connector pin or socket contact to the cable is also very liable to oxidation due to the different materials. This will then lead to high transition resistances and leakage currents.

As an alternative for process data transmission by means of cables, data transmission by means of WLAN or Bluetooth is also employed at present.

However, this solution, too, involves disadvantages in that it is relatively slow compared to cable connections and mainly susceptible to radio interferences. Moreover, there is a disadvantage, in particular when several transmitters are provided, in that the receiver must be tuned to the desired station involving considerable configuration efforts and also sources for errors. Only a few radio frequencies are available. If several transmitters and receivers are operated within the transmission range, interferences by adjacent transmitters occur. The bandwidth must be shared with other apparatuses. If the available bandwidth is not sufficient, the apparatuses may not be operated simultaneously. A matching radio channel must be selected and adjusted. The temporal division of the transmission capacity is also relevant, so that one has to wait for free channels, and moreover, the repetition of transmission in case of an interfered reception takes some time. Changing the channel if interferences occur again also takes time. Moreover, it may not be predicted how long a successful transmission will take. Altogether, process data transmission in real time cannot be performed.

SUMMARY OF THE DISCLOSURE

Starting from this situation, it is one aspect of the present disclosure to provide a connector for data transmission, in particular between two apparatuses for food production, mainly meat and sausage production, and a filling machine, and a method for transmitting data permitting reliable data transmission in real time, and which may moreover be designed to be robust so that they may withstand the rough surroundings often present in particular in food production.

According to the present disclosure, at an interface between two apparatuses for food production, mainly meat and sausages, the connector for data transmission comprises a first connecting element connectable to the first apparatus, and at least one first data transmission part, and a second connecting element that may be coupled to the first connecting element and which may be connected to the second apparatus and comprises at least one second data transmission part. The first data transmission part is galvanically isolated from the second data transmission part in a coupled state of the first and second connecting elements such that data transmission from the first to the second connecting element is effected in a galvanically isolated way, i.e. wirelessly and contactlessly. For galvanically isolated data transmission, various components, such as transformers, capacitors, optocouplers, antennae, directional antennae, optical transmitters and receivers, etc. may be used.

The present disclosure involves the advantage that, compared to conventional plugs, now no more connector pins or socket contacts are necessary which are very interference-prone. Malfunctions, standstills and failures may be minimized. It is furthermore advantageous that with a galvanically isolated data transmission and an integration of the data transmission part into a connecting element, e.g. a housing of a connecting element, no more exposed metallic contacts are required for data transmission. Thus, the connector according to the disclosure is very robust with respect to soiling and moisture, so that the above-described contact problems may be avoided. The connector according to the disclosure moreover permits data transmission in real time.

Advantageously, the connector comprises a mechanical fixing device which couples the first connecting element, in particular its housing, to the second connecting element, in particular its housing. The mechanical fixing device may in particular comprise a screw closure, a pin-and-socket connection, a bayonet catch, a clamped closure or permanent magnets.

It is particularly advantageous for the fixing device to hermetically tightly couple the connecting elements or their housings, so that the data transmission parts are protected from moisture and dirt in the connected first and second connecting elements, even if portions of the data transmission parts in the connecting element are exposed.

It is particularly advantageous for the first and second data transmission parts, however, to be already arranged in a hermetically sealed manner in the first and second connecting elements. Then, the data transmission parts are sufficiently protected from moisture, dirt and mechanical damages even if the connector is in an opened state.

For this, the first or second, or both data transmission parts may be cast into a casing material. The casing material is preferably electrically insulating.

As a casing material, in particular a thermoplastic, such as polyamide, polyester or polyethylene, is suited. However, one- or two-component casting compounds, e.g. epoxy resin, polyester resin, vinyl ester resin, polyurethane, silicone resin, acrylic resin, optionally with fillers, e.g. glass fiber, are also possible.

According to a preferred embodiment, the first connecting element as data transmission part may comprise a primary coil, and the second connecting element as data transmission part may comprise a secondary coil, so that the data are transmitted inductively. Thus, when the first and second connecting elements are coupled, a transformer results which comprises the primary coil and the secondary coil. The cores of the coils may have a semi-annular shape, such that, when the connecting elements are joined, the front sides are facing, a protective layer being optionally disposed over the front side of each core.

Cast-in means that the respective data transmission part is either completely cast-in and enclosed, or that for example sections, such as a capacitor electrode or a section of the coil core, are exposed, where then corresponding sections may optionally be moreover coated with a protective layer.

According to a further preferred embodiment, the primary coil and the secondary coil each correspond to one half of a transformer whose core, in particular annular core, has two parts, such that the respective front sides of the separated cores of the primary and secondary coils in the coupled state of the first and second connecting elements are oriented in a facing relationship and preferably located one against the other. If the primary coil and the secondary coil have corresponding designs, the manufacture of the connector is very simple.

According to a further embodiment, the first connecting element and the second connecting element may be designed such that the data are transmitted capacitively, the first connecting element as data transmission part comprising at least two first capacitor electrodes, and the second connecting element as data transmission part comprising at least two second capacitor electrodes, the first and second capacitor electrodes facing each other in a coupled state of the connecting elements.

For example, since information are transmitted differentially without direct voltage supply in Ethernet-based transmission paths, capacitors for line disconnection may be inserted without any problems. In the capacitor, information are transmitted by an electric field. A capacitor may be built from two insulated electrodes and thus a hermetically tight disconnection point may be produced. It is also possible to further cast in the respective capacitor electrodes. When the first and second connecting elements are being joined, the capacitor electrodes are then oriented again at a small distance of e.g. 1 mm with respect to each other, so that the electric field is closed again and information may thus be transmitted unimpededly.

According to a preferred embodiment, in the first connecting element, several capacitor electrodes are arranged planely, in particular as plane rings on a support, in particular a cylinder. The second connecting element is then designed as a sleeve which comprises several plane capacitor electrodes which are in particular designed as plane rings. In the coupled state of the connecting elements, i.e. when here in particular the support is inserted into the sleeve and fixed, the first capacitor electrodes are facing the second capacitor electrodes.

According to a further embodiment, data transmission is effected via electromagnetic waves, where in particular the first connecting element as data transmission part comprises a transmitter and the second connecting element as data transmission part comprises a receiver. As transmitter and receiver, for example transmitting respectively receiving antennae, or combined transceiver antennae may be used. These antennae are suited in case of radio transmission for frequencies of 2-100 GHz. In case of a transmission with preferably coherent light, e.g. within a wavelength range of 400-1000 nm, the optical transmitter may be, for example, a light-emitting diode (LED) or a laser diode, and the optical receiver may be, for example, a phototransistor or a PIN diode.

It is advantageous for the first and second connecting elements each to comprise several data transmission parts for several transmission paths, in particular several coils, several capacitor electrodes, several transmitters or receivers. Furthermore, the connector may also comprise a path for energy transmission.

Thus, the connector permits a wireless and contactless transmission process for data.

According to the present disclosure, the first and second apparatuses are at least two apparatuses of the following group: filling machine, wring-off unit, clipper, hangup, separation element, conveying belt, handling apparatus, packing unit. In particular in sausage production, the individual components may then be easily and securely connected via the inventive connector, the connectors being sufficiently protected even in retrofitting, exchanging and cleaning processes of individual apparatuses within one line.

According to the present disclosure, at least one of the connecting elements, or both of them, may be connected with a corresponding apparatus via a cable. However, it is also possible to integrate a connecting element into the apparatus as connection interface. The cables may be connected to the connecting elements or their housing in a hermetically tight manner.

The disclosure also relates to a filling machine for sausage production with several apparatuses, i.e. with additionally at least one attachment as it was described above. At least two apparatuses of the complete filling line are then connected with a connector according to the disclosure.

In the method according to the disclosure for transmitting data from a first apparatus to a second apparatus by means of the connector according to the disclosure, the first and second connecting elements are initially connected to each other by the mechanical fixing device, where then data transmission from the first to the second connector is effected in a galvanically isolated manner, i.e. for example in an inductive, capacitive or optical manner, or via electromagnetic waves.

BRIEF DESCRIPTION OF THE DRAWINGS

The present disclosure will be illustrated below in greater detail with reference to the following figures.

DETAILED DESCRIPTION OF THE DISCLOSURE

Figure 1:
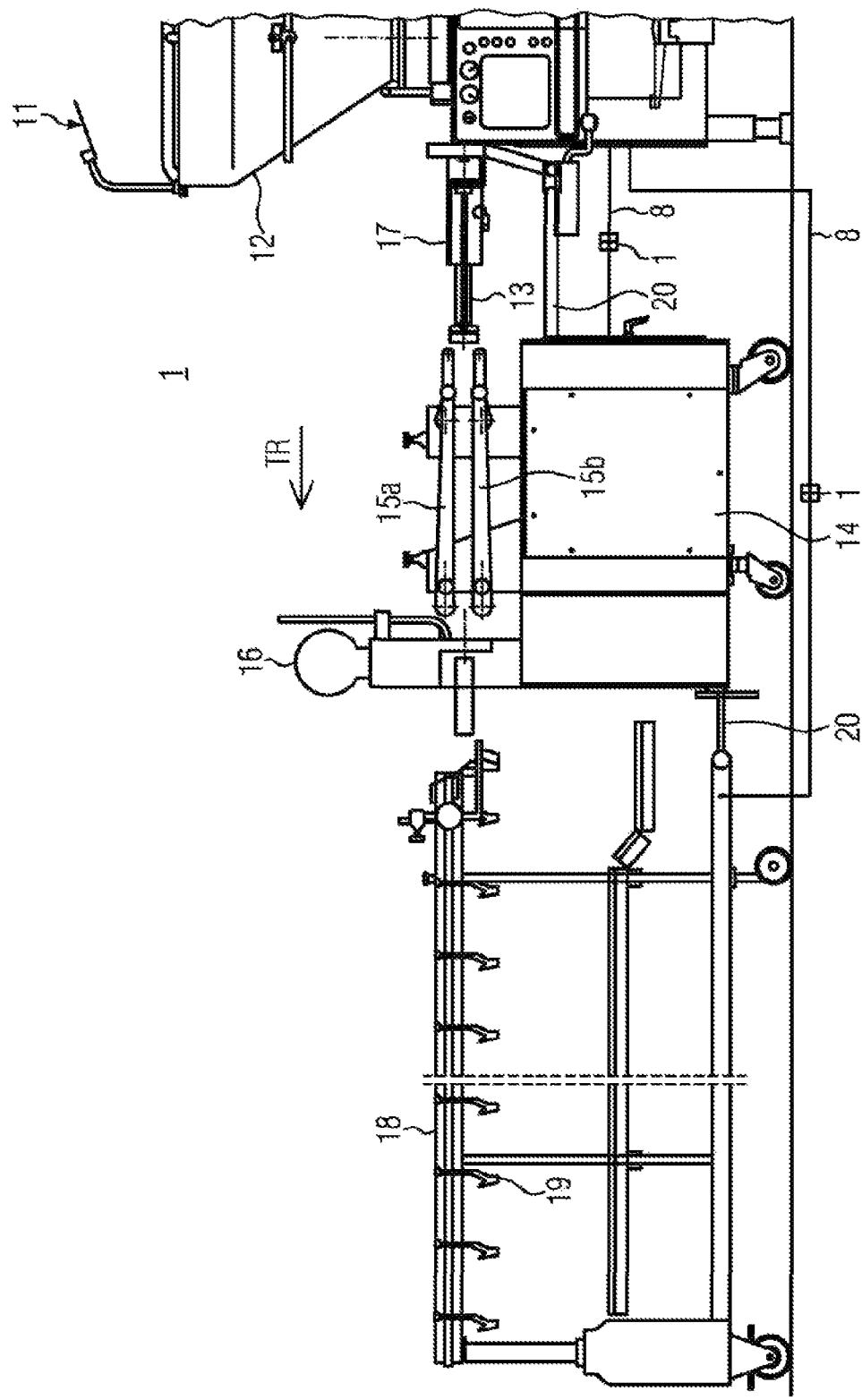
FIG. 1 roughly schematically shows a side view of a filling machine according to the present disclosure.

FIG. 1 shows in a schematic representation a filling machine 11 with several attachments. The filling machine 11 comprises in a well-known manner a funnel 12 into which, for example, pasty mass, such as sausage meat, is filled and ejected into a sausage casing via a not represented feed mechanism through a filling tube 13. For example, a transport device 14 is disposed downstream of the filling machine 11 in the direction of transport TR, said transport device comprising two circulating conveyor belts 15a, 15b between which the filled sausage length is transported. The transport device may also retain the filled sausage length against twisting when the filled sausage length is rotated by a wring-off unit 17 to generate a wring-off point.

Furthermore, a clipper 16 may be disposed in the line to place a clip between two sausage portions. Finally, a hangup 18 is also arranged in this particular example which may receive individual sausages or sausage portions at its hooks 19 and transport them further.

The construction shown in FIG. 1 is only given by way of example. Individual apparatuses of a filling line may be connected to each other with mechanical connectors 20. For process data transmission, cables 8 are provided here which are connected with the inventive connectors 1 which will be described more in detail below. In this example, the hangup 18 is connected via the cable 8 with a connector 1 to the control system of the filling machine 11. The transport device 14 is also connected via a cable 8 with a corresponding connector 1 to the control system of the filling machine. For example, the transport device could also be connected with the hangup 8 via a cable by means of connectors 1.

To allow for the rough conditions in food production, for a corresponding filling machine or a corresponding filling line, a connector system for data transmission at an interface between two apparatuses which may be designed as follows is suggested.

Figure 5:
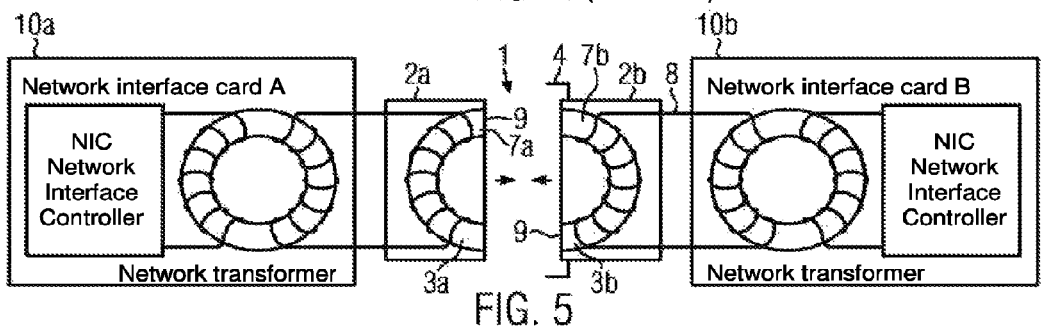
FIG. 5 shows a connector according to the present disclosure for inductive data transmission.

In the present disclosure, the connector 1 comprises, as can be seen in particular in FIG. 5, a first connecting element 2a and a second connecting element 2b which may be coupled to each other for connecting the data lines, as also was the case before with conventional plugs.

The connecting elements comprise data transmission parts 3a and 3b, these data transmission parts being designed such that in a coupled or connected state of the first and second connecting elements, the data transmission parts 3a, b are galvanically isolated (i.e. without contact). Here, in this first embodiment, metallic separation is accomplished by two electrically insulated windings, and data transmission is accomplished inductively. Here, the first connecting element 2a as data transmission part comprises a primary coil 3a which comprises a core 7a. The core 7 is bent and comprises two front sides 9 each which may face an opposed connecting element. The second connecting element 2b comprises a corresponding secondary coil 3b.

When the primary and secondary coils are joined, i.e. when the first and second connecting elements are coupled, the two half-coils operate as a network transformer.

For inductive transmission, existing Ethernet standards according to IEEE 802.3 may be used. The disclosure is therefore based on the principle of the following deliberation.

Figure 2:
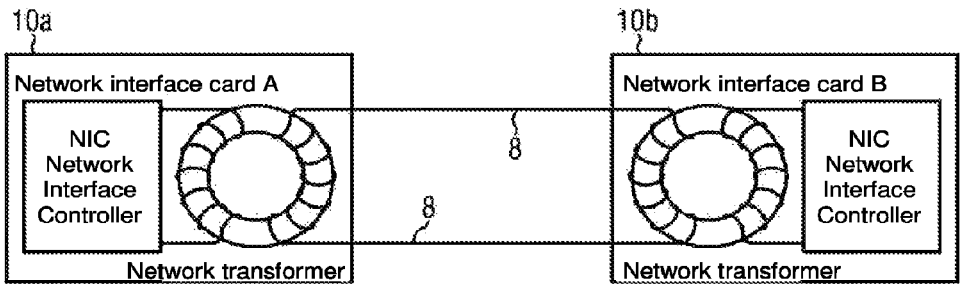
FIG. 2 schematically shows a network connection according to prior art.

As is shown in FIG. 2, e.g. in Ethernet-based transmission paths, a transformer is used on the transmitter and on the receiver sides for galvanic isolation. Information is forwarded from the transformer via a magnetic field. FIG. 2 shows a network interface card A of a first apparatus 10a and a network interface card B of a second apparatus 10b, network interface controllers being provided in each case. The network interface cards comprise conventional network transformers, as was described above. Via lines or cables 8, the network transformers of the apparatuses 10a, b may be connected to each other.

Figure 3:
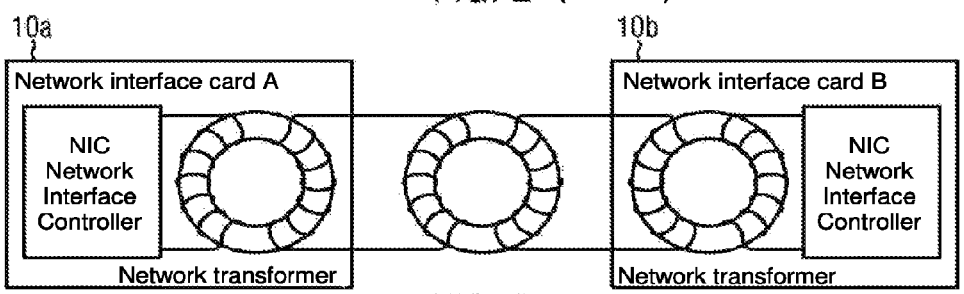
FIG. 3 shows related art in the form of the network connection shown in FIG. 2 with an additional transformer.
Figure 4:
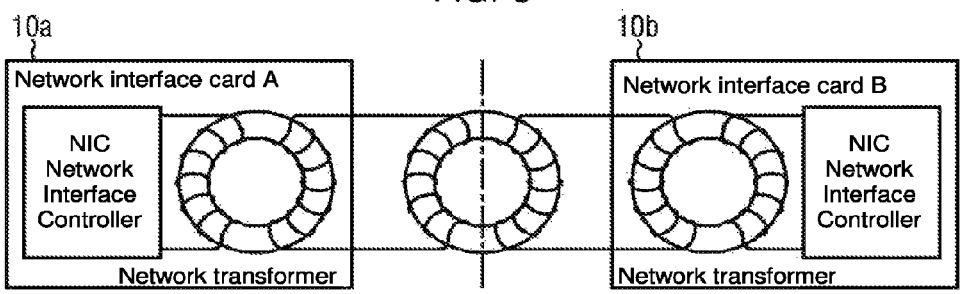
FIG. 4 shows related art in the form of the network connection shown in FIG. 3 with an inserted disconnection point.

Since in transmission paths, in particular Ethernet-based ones, the transformers for galvanic isolation are used both on the transmitter and on the receiver sides, one may easily insert an additional transformer in the path, as is represented in FIG. 3. The additional transformer may be split and cut into two halves, as is represented in FIG. 4.

After the disconnection point has been joined, the magnetic field is closed again and information may be transmitted in an unimpeded manner.

So, the data transmission part 3a, b may be easily produced by splitting a conventional transformer, for example one which complies with Ethernet standard, into two parts or joining a transformer from two core halves.

These data transmission parts may then be integrated into the respective connecting elements 2a, b. The primary and secondary coils may be cast into a casing material, e.g. synthetic resin or thermoplastics. The coils are completely cast in, such that a thin layer is also formed on the front face 9 of the cores 7a, b. This layer, however, should not exceed 0.2 mm to ensure perfect data transmission. It is also possible for the coils 3a, b to be cast in such a way that the front sides 9 of the cores 7a, b are exposed. Then, the front sides of the cores may be exactly brought one upon the other when the connecting elements are being connected. The windings of the coils are nevertheless sufficiently protected from moisture and dirt in their open state. It is also possible for the exposed front sides 9 of the cores 7a, b to be sealed by a thin coating on the connector's front side (which faces the opposite connecting element). As such a thin layer, for example a foil of a thickness of 20 μm to 300 μm may be used. The coils, i.e. the wound conducting wires, are in any case disposed in the connecting elements in a hermetically sealed manner.

The connecting elements 2a, b comprise a mechanical fixing device 4 via which the first connecting element 2a may be coupled with the second connecting element 2b, as is schematically indicated, for example, in FIG. 5. Such mechanical fixing device may comprise, for example, a screw closure, a pin-and-socket connection, a bayonet catch, a clamping device, or permanent magnets. It is particularly advantageous for the fixing device 4 to be designed such that a hermetically tight connection is formed between the connecting elements 2a, b. This provides additional protection.

Figure 6:
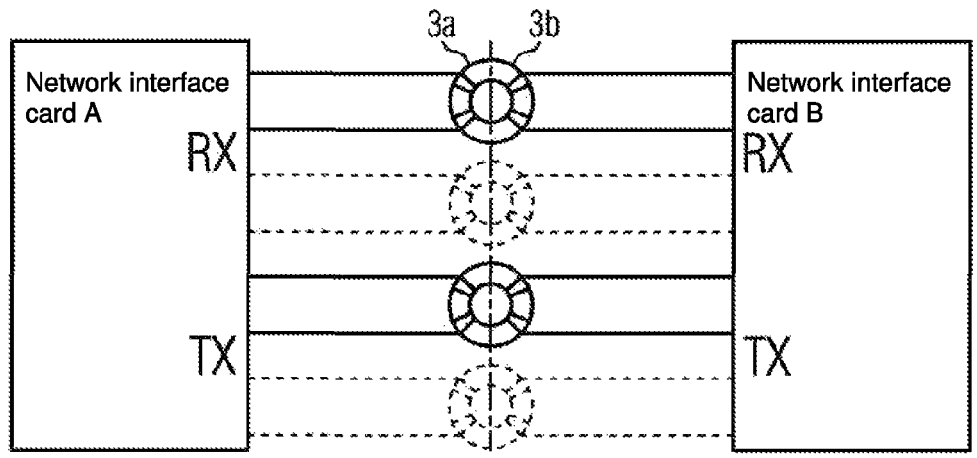
FIG. 6 roughly schematically shows the principle of a connector according to the present disclosure with several transmission paths.

In the functional diagrams in FIGS. 2 to 5, only one transmission path was shown in each case. For an Ethernet connection, however, for example at least one transmitting and one receiving channel each (up to 100 MBit/s), or even two transmitting and receiving channels (Gigabit Ethernet) are required. FIG. 6 now roughly schematically shows two transmitting and receiving channels each between the network interface cards A and B with altogether 4 transformers or 8 half transformers.

Figure 7:
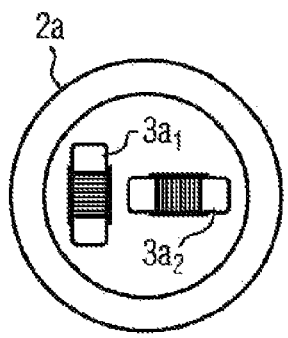
FIG. 7 shows a cross-section through a front portion of a connector according to the disclosure with two data transmission parts.

The several half transformers or coils are aligned at the plug's front face, as is represented for example in FIG. 7, such that the magnetic stray fields do not interact.

Figure 8:
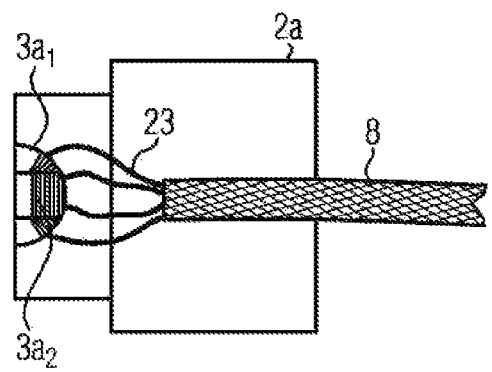
FIG. 8 shows a longitudinal section through a connector according to the disclosure.
Figure 9:
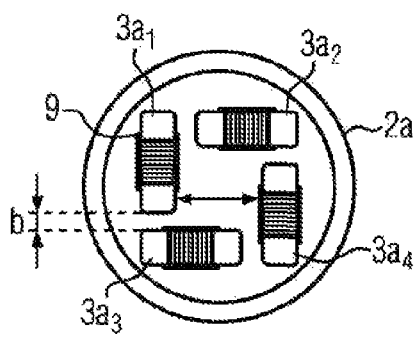
FIG. 9 shows a cross-section through a connector according to the disclosure with four data transmission parts.

FIG. 7 shows two adjacently disposed first primary coils 3a1, 3a2 which are disposed perpendicularly with respect to each other. FIG. 8 shows a longitudinal section of a corresponding embodiment with two coils 3a1 and 3a2 located perpendicularly with respect to each other which are each connected with the corresponding signal cables 23 and end in a cable 8. For better protection, the signal cables 23 and the cable 8 are also cast into the connecting element 2a. FIG. 9 shows a front view of a connecting element 2a with four primary coils where the distance between two coils that are oriented at the same angles is greater than the distance between two coils that are disposed offset with respect to each other by about 90°. This arrangement results in a compact design with only little interaction.

The corresponding second connecting elements 2b are then designed such that the respective front sides 9 of the individual cores 7 are facing each other when the connecting elements 2a, b are connected.

As a basis for the connector, for example a transformer having the following ratings is used: inductance 350 μH at 100 kHz, 100 mV AC, 8 mA DC, transformation ratio 1:1.

In such transformers, the distance a between two coils which are oriented essentially in the same direction, i.e. in parallel with respect to each other, should be within a range of 5 to 10 mm. The distance b between two coils which are oriented essentially perpendicularly with respect to each other should be within a range of 2 to 5 mm.

This embodiment involves the advantage that it is not necessary to employ a special protocol which masters addressing, frequency change, repetition or collision detection. Moreover, no special modulation process is required. Data transmission in real time is possible.

In connection with FIGS. 10 to 15, a further embodiment according to the present disclosure will be illustrated more in detail in which data transmission is effected with an electric field, i.e. capacitively. This embodiment corresponds to the embodiment shown in connection with FIGS. 2 to 9, with the exception that it now comprises, instead of the primary and secondary coils 3a, b, two capacitor electrodes 3a, b each. For capacitive transmission, too, existing Ethernet standards according to IEEE 802.3 may be used.

Since for example in Ethernet-based transmission paths, information are transmitted differentially without direct voltage supply, further capacitors for line disconnection may be inserted without any problems.

In the capacitor, information are forwarded by an electric field. A capacitor may be produced by two electrically insulated electrodes and thus a hermetically tight disconnection point may be produced. By approaching the two electrodes, the electric field is closed and the information may be transmitted in an unimpeded manner, as will be illustrated more in detail below. The capacitor electrodes may be each completely embedded in an electrically insulating casing material, in particular cast into it, for example in synthetic resin or thermoplastics.

Figure 10:
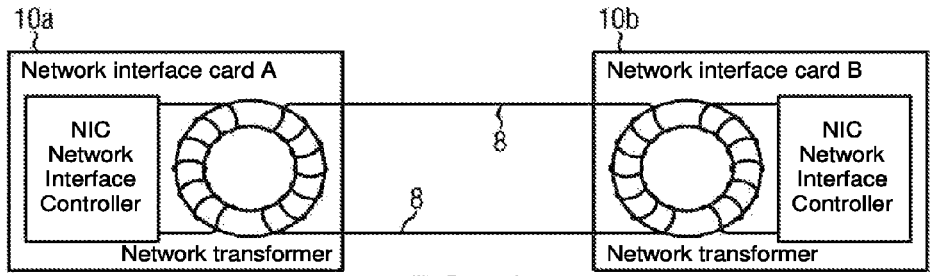
FIG. 10 shows a conventional network connection setup.
Figure 11:
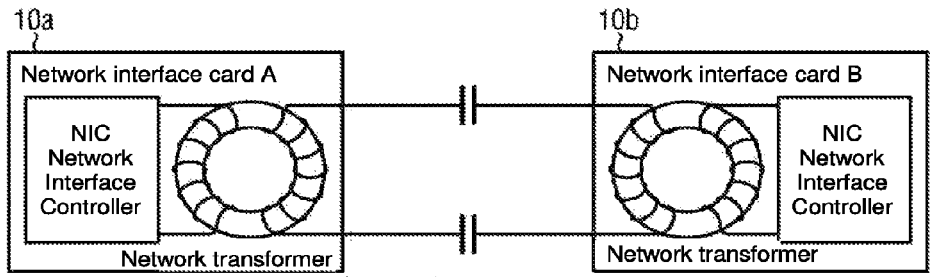
FIG. 11 shows related art in the form of the network connection setup with an inserted capacitor.
Figure 12:
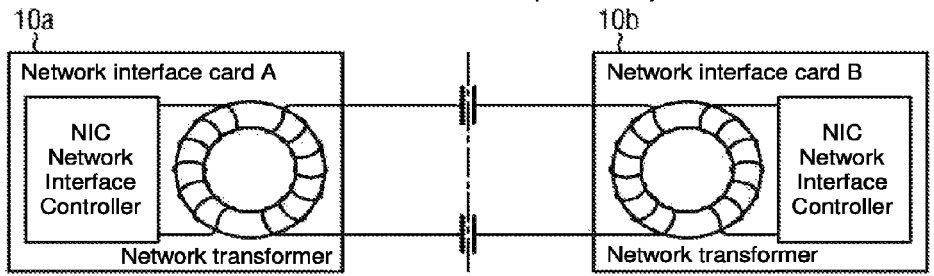
FIG. 12 shows related art in the form of the network connection shown in FIG. 11 with an opened capacitor.
Figure 13:
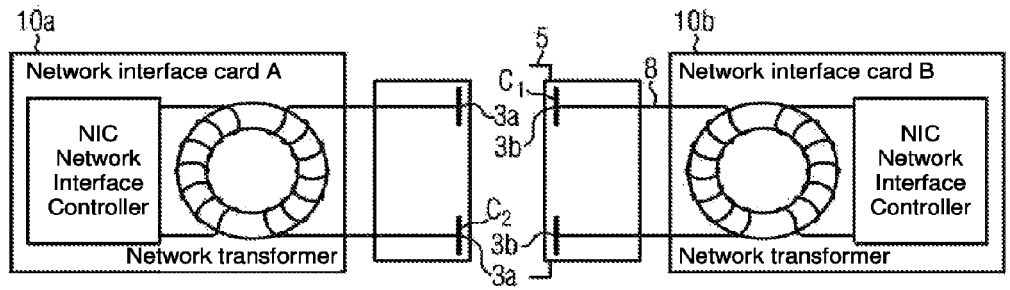
FIG. 13 shows a connector according to the present disclosure wherein data are transmitted capacitively.

FIGS. 10 to 12 illustrate that a capacitor may be inserted between two network transformers, where then the two data transmission parts may be obtained by simply splitting the capacitor.

The characteristics of the employed capacitor are, for example: C=5 to 50 nF.

Figure 14:
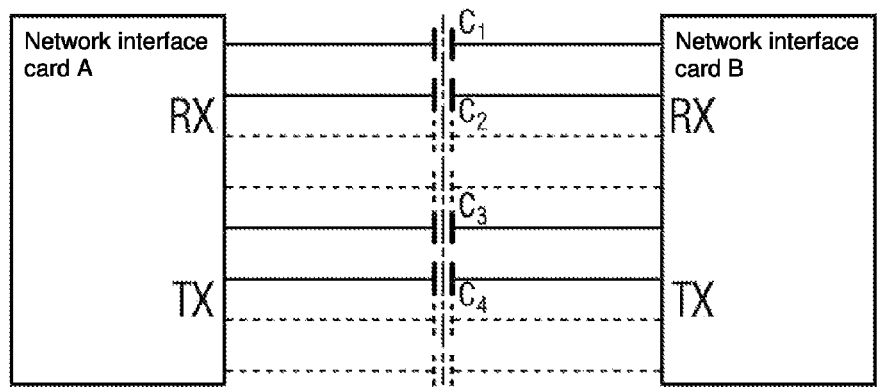
FIG. 14 schematically shows the principle of a connector with several transmission paths.

In the functional diagrams 10 to 13, only one transmission path has been always shown before. For an Ethernet connection, however, at least one transmitting and one receiving channel each (up to 100 MBit/s), or even two transmitting and receiving channels are required. FIG. 14 roughly schematically shows two network interface cards A, B of two different apparatuses each with one transmitting and one receiving channel, where the transmitting and receiving channels each comprise two capacitors C1, C2 and C3, C4.

Figure 15A:
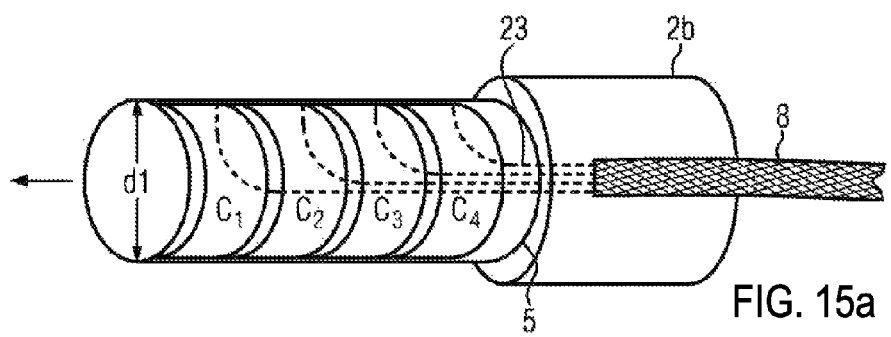
FIG. 15a perspectively shows a preferred embodiment of a connector for capacitive data transmission with several capacitors.
Figure 15B:
FIG. 15b schematically shows a preferred embodiment of a connector for capacitive data transmission with several capacitors.

FIGS. 15a and 15b show a special embodiment of capacitive data transmission. The shown capacitors C1 to C4 are here e.g. applied onto a cylinder as plane rings. The electrode surfaces are connected with corresponding signal cables 23 which extend within the cylinder. As a protection, a protective layer may be applied onto the surfaces of the capacitor electrodes, for example in the form of a foil, a tubing or protective lacquer.

The connecting element 2a is provided as a counterpart which is designed as a sleeve, such that the connecting element 2b may be at least partially inserted into said sleeve 2a, the diameter $d_2$ being greater than the diameter $d_1$. At the inner surface of the sleeve, annular capacitor electrodes of the capacitors C1 to C4 are also attached, where in a coupled state of the connecting elements 2a, b, the electrodes are each located opposite the sleeve at a distance. The connector comprises a mechanical fixing device which is indicated with 5, for example a pin-and-socket connection, via which the sleeve may be oriented with respect to the cylinder and via which a hermetically tight connection may be produced. The capacitor electrode surfaces of the sleeve may also be coated for protection, for example with a foil or insulation layer of a thickness of 50 μm to 200 μm. Here, too, the cables 8 are cast into the connecting elements 2a, b. The capacity of the capacitor is suitably 5 nF to 50 nF.

Figure 16:
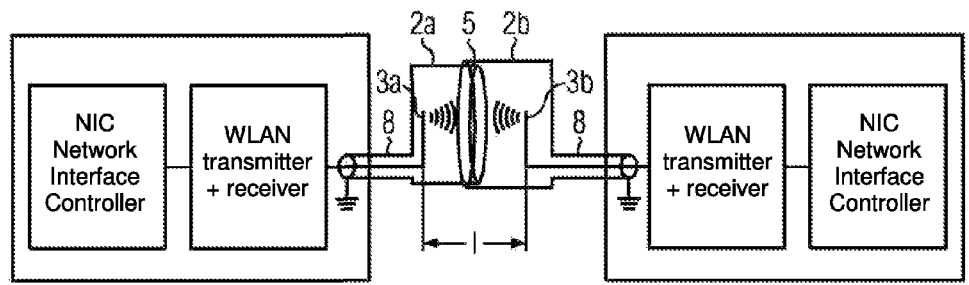
FIG. 16 shows a further embodiment of a connector for data transmission by means of electromagnetic waves.
Figure 17:
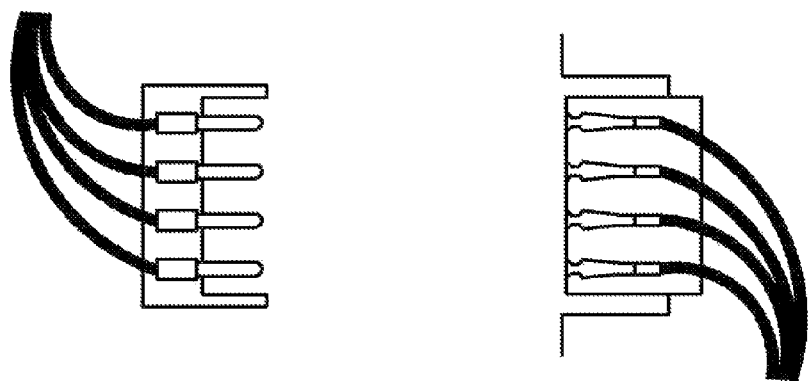
FIG. 17 shows a pin-and-socket connection for data transmission according to prior art.

FIG. 16 shows another embodiment of the present disclosure, where data are transmitted via electromagnetic waves. The assembly shown in FIG. 16 corresponds to the assembly of the previous embodiments, here a transmitter 3a and a receiver 3b being used as data transmission part. In case of radio transmission (frequency range 2 GHz to 100 GHz), corresponding antennae (transmitting and/or receiving antennae) 3a, b may be used. The distance I between the antennae in a closed state of the connector is within a range of 1 mm to 20 mm. The antennae are integrated in the first and second connecting elements. The antennae 3a, b may be cast into the connecting element which offers additional protection. As an alternative or in addition, the fixing device may hermetically tightly connect the two connection elements. By the small distance between the antennae 3a, b and the correct constant orientation of the antenna, exact data transmission may be realized. By the antennae being disposed in the connecting element, in particular in the housing, one may also realize a shielding towards the outside, for example by attaching a grounded conductive layer at the outside of the connecting element 2a. As an alternative, the complete connecting element may be produced from conductive material.

If the antennae are cast in, a thermoplastic, e.g. polyamide, polyester or polyethylene, should be used as a casing material. However, one- or two-component casting compounds, such as epoxy resin, polyester resin, vinyl ester resin, polyurethane, silicone resin, acrylic resin, optionally with fillers, e.g. glass fiber, are also suited. Here, too, the cables 8 may be cast into the connecting elements. As can be taken from FIG. 16, the signal cables then lead, for example, to a WLAN transmitter and receiver which is connected with a network interface controller.

The arrangement shown in FIG. 16 may not only be used wirelessly, but also with preferably coherent light for data transmission (wavelength 400 nm-1000 nm). Here, an optocoupler is connected with the respective network interface controllers, where instead of the antenna 3a as transmitter, a laser diode is used, for example, and as a receiver 3b, a photodetector, in particular a phototransistor or a PIN diode, is used. In this embodiment, the data transmission parts 3a, b are then either not cast in or cast into a transparent medium, for example acrylic resin.

Furthermore, a combination of conventional transmission by contact and a contactless or wireless transmission is possible, as was shown in connection with FIGS. 2 to 16. Here, the operating voltage may be transmitted via robust contacts while the transmission of the process data functions by means of the inventive contactless devices or methods. For example, data transmission may also be accomplished capacitively and energy transmission inductively, or vice-versa. A combination of various wireless, i.e. galvanically isolated transmission methods, as they have been shown in the different embodiments, is also possible.

In all embodiments, the connecting elements may be connected with the respective apparatuses via cables 8. However, it is also possible that one of the connecting elements is integrated in an apparatus into which the other connecting element is then plugged in.

In the method according to the disclosure where two apparatuses are to be connected to each other for data transmission at a certain interface, initially the first and second connecting elements 2a, b are connected to each other via the fixing device 4, e.g. inserted into one another, screwed down, etc. Then, data transmission from the first to the second connecting element may be accomplished in a galvanically isolated manner i.e. contact- and wirelessly.

The invention claimed is:

1. A connector for data transmission at an interface between two apparatuses for food production, comprising:
    a first connecting element connected to a first apparatus for food production and having at least one first data transmission part, and
    a second connecting element coupled to the first connecting element and connected to a second apparatus for food production and having at least one second data transmission part,
    the first data transmission part being galvanically isolated from the second data transmission part, and
    a primary coil and a secondary coil each corresponding to one half of a transformer having a core that is split, and respective front sides of the split cores of the primary and secondary coils oriented so as to face each other.

2. The connector according to claim 1, further comprising a mechanical fixing device which couples the first connecting element with the second connecting element, the mechanical fixing device comprising one of a screw closure, a pin-and-socket connection, a bayonet catch, a clamped closure, and a coupling by means of a permanent magnet.

3. The connector according to claim 2, and the first connecting element and the second connecting element are coupled in a hermetically tight manner.

4. The connector according to claim 1, and the at least one first and the at least one second data transmission parts being cast into a casing material.

5. The connector according to claim 4, and the casing material being a thermoplastic or a synthetic resin.

6. The connector according to claim 1, and the at least one first data transmission part and the at least one second data transmission part being disposed in the respective first and second connecting elements in a hermetically sealed manner.

7. The connector according to claim 1, and the first connecting element avs the at least one first data transmission part comprises the primary coil, and the second connecting element as the at least one second data transmission part comprises the secondary coil, and the data being transmitted inductively.

8. The connector according to claim 1, and the transformer core is an annular core.

9. The connector according to claim 1, and data transmission is effected via electromagnetic waves.

10. The connector according to claim 9, and either the first connecting element as the at least one first data transmission part comprises a transmitting antenna, and the second connecting element as the at least one second data transmission part comprises a receiving antenna, or the first connecting element and the second connecting element as the respective at least one first and the at least one second data transmission parts comprise a combined transmitting and receiving antenna, or an optocoupler is provided as transmitter and receiver.

11. The connector according to claim 1, and the food production comprises meat and sausage production.

12. The connector according to claim 1, and at least one of the first and second connecting elements or both are connected with one of the first and second apparatuses for food production via a cable.

13. A filling machine for sausage production with a plurality of apparatuses for food production, comprising at least two apparatuses for food production connected with a connector formed according to claim 1 for process data transmission.

14. A method for transmitting data from a first apparatus for food production to a second apparatus for food production with the aid of a connector formed according to claim 1, comprising
    the first and second connecting elements being mechanically connected to each other with a fixing device, and
    data transmission from the first to the second connecting element being effected in a galvanically isolated manner.

15. A connector for data transmission at an interface between two apparatuses for food production, comprising:
    a first connecting element connected to a first apparatus for food production and having at least one first data transmission part, and
    a second connecting element coupled to the first connecting element and connected to a second apparatus for food production and having at least one second data transmission part,
    the first data transmission part being galvanically isolated from the second data transmission part, and
    the first connecting element and the second connecting element are designed such that the data are transmitted capacitively, and the first connecting element as the at least one first data transmission part comprises at least two first capacitor electrodes, and the second connecting element as the at least one second data transmission part comprises at least two second capacitor electrodes, the at least two first and the at least two second capacitor electrodes facing each other.

16. A connector for data transmission at an interface between two apparatuses for food production, comprising:
- a first connecting element connected to a first apparatus for food production and comprises at least one first data transmission part, and
- a second connecting element coupled to the first connecting element and connected to a second apparatus for food production and comprises at least one second data transmission part,
- the first data transmission part is galvanically isolated from the second data transmission part, and
- the first and second apparatuses for food production each comprising at least two of the following group:
- a filling machine, a wring-off unit, a clipper, a hangup, a separation element, a conveying belt, a handling apparatus, and a packing unit.

17. A connector for data transmission at an interface between two apparatuses for food production, comprising:
- a first connecting element connected to a first apparatus for food production and comprises at least one first data transmission part, and
- a second connecting element coupled to the first connecting element and connected to a second apparatus for food production and comprises at least one second data transmission part,
- the first data transmission part being galvanically isolated from the second data transmission part, and
- respective ones of a plurality of the first and second connecting elements each having a plurality of at least one first and at least one second data transmission parts for providing a plurality of transmission paths.

18. The connector according to claim 17, and the data transmission parts comprises respective pluralities of one of coils, capacitor electrodes, transmitting and receiving antennae, optical transmitters, and receivers.

19. A connector for data transmission at an interface between two apparatuses for food production, comprising:
- a first connecting element connected to a first apparatus for food production and comprises at least one first data transmission part, and
- a second connecting element coupled to the first connecting element and connected to a second apparatus for food production and comprises at least one second data transmission part,
- the first data transmission part is galvanically isolated from the second data transmission part, and
- the first connecting element and the second connecting element designed such that the data are transmitted capacitively, and the first connecting element as the at least one first data transmission part comprises at least two first capacitor electrodes, and the second connecting element as the at least one second data transmission part comprises at least two second capacitor electrodes, the at least two first capacitor electrodes and the at least two second capacitor electrodes facing each other, and
- in the first connecting element, a plurality of the at least two first capacitor electrodes being disposed planely, and the second connecting element is designed as a sleeve which comprises a plurality of the at least two second capacitor electrodes which are disposed planely and located opposite the at least two first capacitor electrodes, and
- the plurality of the at least two first capacitor electrodes of the first connecting element comprise plane rings on a support.

20. The connector according to claim 19, and the support comprises a cylinder.

21. The connector according to claim 19, and the plurality of the at least two second capacitor electrodes of the second connecting element comprises plane rings.

* * * * *